United States Patent Office 2,837,566
Patented June 3, 1958

2,837,566

PROCESS FOR RECOVERY OF ORGANIC ACIDS

Julian Feldman, Cincinnati, and Orville D. Frampton, Wyoming, Ohio, assignors to National Distillers and Chemical Corporation, a corporation of Virginia No Drawing. Application October 19, 1956
Serial No. 616,913

9 Claims. (Cl. 260—533)

The present invention relates to an improvement in processing of certain compositions comprising toluene-insoluble, water-soluble relatively high molecular weight organic acids for obtainment of a substantial amount of toluene-soluble organic acids from said compositions. More particularly, the process embodied herein relates to an improvement in a process wherein an olefinic material is reacted with a finely divided alkali metal under conditions to selectively form in high yields the dialkali metal derivatives of dimers of the olefinic material, conversion of such derivatives to salts of dicarboxylic acids containing two more carbon atoms per molecule than said dimer, liberation of the free acids from said salts, and obtainment therefrom of desired diacids in improved yield.

The process embodied herein which provides the improvements described more fully hereinafter may be utilized in the treatment of mixtures comprising carboxylic acids prepared by carbonation of metal derivatives of olefinic materials and, particularly, carboxylic acid mixtures derived from initial reaction between an olefin and an alkali metal under metalation reaction conditions to selectively form in high yields the dialkali metal derivatives of dimers of the olefin. With respect thereto, the selective dimerization process may be carried out with olefinic materials such as conjugated dienes illustrated by butadiene, isoprene, 4-methyl-1,3-pentadiene, 2-methyl 1,3-pentadiene, and the like. In preferred aspect, the treatment embodied herein is utilized in a process wherein a conjugated diene of from 4 to 8 carbon atoms is reacted with an alkali metal in finely dispersed form under metalation reaction conditions to provide a reaction mixture comprising dialkali metal derivatives of dimers of the diene followed by carbonation of the reaction mixture to produce a carbonated mixture comprising dialkali metal salts having two more carbon atoms per molecule than said dimer, liberation of the acids from their salts, and recovery of desired organic acids in improved yield.

For purposes of illustration, and as a particularly important application of this invention is its use in treatment of carboxylic acid mixtures derived from initial reaction between a conjugated diene and an alkali metal in finely dispersed form, the invention is described with emphasis on carboxylic acid mixtures prepared from a method as set forth hereinafter.

In recently developed processes, it has been found that an olefinic hydrocarbon material can be treated with a finely divided alkali metal in a selected ether medium under selected conditions in the presence of a relatively small amount of a polycyclic aromatic hydrocarbon and/or a suitable attrition agent at a temperature preferably below about 0° C. to produce a mixture comprising dimetallo derivatives of the dimerized olefin. For example, in the case of initial reaction between sodium and butadiene, the reaction product comprises a mixture of disodium derivatives of isomeric octadienes; and in the use of other diolefins for the initial reaction, such as isoprene, methyl pentadienes, and the like, corresponding- ly similar reaction mixtures are obtained. In addition to the dimetallo derivatives of the dimers of the diolefin, relatively small amounts of alkali metal derivatives of the diolefin, monoalkali metal derivatives of the dimerized olefin as well as other alkali metal alkenes are formed during the initial reaction between the diolefin and the finely dispersed alkali metal. Thus, upon carbonation, the reaction mixture is converted to a mixture comprising salts of unsaturated dicarboxylic acids having two more carbon atoms per molecule than the dimerized diolefin, salts of unsaturated monocarboxylic acids as well as polycarboxylic acids, i. e., more than two carboxylic groups per molecule. For example, in the use of butadiene and finely dispersed sodium for the initial reaction, there is produced, upon carbonation of the reaction mixture, a carbonated mixture comprising predominantly the disodio salts of isomeric $C_{10}$ unsaturated dicarboxylic acids, a small amount of unsaturated monocarboxylic acids including $C_5$, $C_9$, $C_{13}$, and higher molecular weight monocarboxylic acids as well as a small amount of salts of polycarboxylic unsaturated aliphatic acids.

Such a mixture of unsaturated sodium salts may be subjected to neutralization in an aqueous medium whereby there is produced an organic phase comprising in solution the bulk of the resulting free unsaturated acids and an aqueous phase which normally contains a small amount of carboxylic acids, and inorganic salts formed by the neutralization treatment. Preferably, however, the aqueous mixture comprising the salts of the unsaturated acids is subjected to hydrogenation, and the resulting aqueous mixture of the salts of the corresponding saturated acids is subjected to neutralization whereby there is produced an organic phase containing the bulk of the free carboxylic acids in solution and an aqueous phase comprising water soluble carboxylic acids and water soluble salts formed in the neutralization treatment. Such an aqueous mixture generally contains up to about 10% by weight of the total carboxylic acids liberated in the neutralization treatment. Preferably, however, the neutralization step is carried out in the presence of a selective aromatic hydrocarbon solvent for the liberated substantially water-insoluble organic acids as presence of such a solvent generally minimizes the solvency in the resulting organic phase of inorganic salts formed in the neutralization step. Examples of such a selective solvent include benzene, toluene, xylene, ethylbenzene, cumene, cymene, etc.

With further reference to the aforesaid series of reactions for preparation of mixtures of carboxylic acid mixtures as aforedefined, the alkali metal employed is preferably sodium, although other alkali metals such as potassium or lithium may be employed either alone or in admixture with sodium. Moreover, mixtures of sodium or potassium with other metals such as calcium can also be used. In carrying out the initial metalation reaction, it is necessary that the alkali metal be used initially in a finely divided form and, generally, as a fine dispersion of the alkali metal having an average particle size of less than 50 microns with a size range of five to fifteen microns being quite satisfactory. The dispersion may be conveniently prepared in an inert hydrocarbon as a separate step preliminary to the metalation reaction with the diolefin.

The metalation reaction is carried out in a reaction medium consisting essentially of an ether of a particular class of ethers that appear to possess the common property of serving as promoters of the selective dimerization reaction involved. The ether can be any aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of such methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. The ethers employed should not contain any groups such as hydroxyl, carboxyl, and the like which are distinctly reactive towards an alkali metal such as sodium. Although the ether may react in some reversible manner, it must not be subject to extensive cleavage as cleavage action destroys the ether, uses up sodium and introduces, into the reacting system, alkali metal alkoxides which, in turn, tend to induce rubber-forming reactions (polymerization) rather than the desired dimerization reaction. Although the reaction medium should consist essentially of the specific ethers, other inert media can be present in limited amounts. In general, these inert media will be introduced with the sodium dispersion as the liquid in which the alkali metal is suspended and will act chiefly as diluents. The concentration of ether in the reaction mixture should at all times be maintained at a sufficient level to have a substantial promoting effect upon the desired dimeriziration reaction.

It is usually desirable to include in the dimerization reaction mixture at least one supplementary activating material. This material is a relatively small amount of at least one material from the class of polycyclic aromatic hydrocarbons such as naphthalene and phenanthrene, as well as the uncondensed polycyclic compounds such as diphenyl, the terphenyls, dinaphthyl, tetraphenyl ethylene, and the like. The polyphenyl compounds such as diphenyl and the terphenyls and their mixtures have been found to be particularly useful. The amount of the activating hydrocarbon to be used will vary over a range which in every case will be relatively small in comparison with the amount of butadiene undergoing reaction. Concentrations in the range of 1 to 10 weight percent based on the amount of the diolefin are ordinarily quite sufficient. As to the attrition agent for use in such a reaction, its use generally effects an overall increase in reaction rate and improved utilization of the alkali metal. Materials useful therefor include inorganic solids such as alkali metal salts from the classes of halides and sulfates, for example sodium chloride, potassium chloride, sodium sulfate, potassium sulfate and the like. Also useful are metallic and non-metallic oxides which are not reactive with the alkali metal under the conditions of reaction. Thus, sand, diatomaceous earth, rutile, iron oxide, magnesia and alumina may be used. Other materials, inert to the reaction, such as graphite, zircon, and powdered coal are operable.

The reaction temperature for the metalation reaction is preferably held below 0° C. with a temperature range between —20° to —50° C. being particularly preferred.

In one typical method for carrying out the afore-described metalation process, the alkali metal (e. g., sodium) dispersion is initially prepared by placing an inert hydrocarbon such as isooctane in a suitable vessel with the appropriate amount of sodium. The mixture is heated in a surrounding bath or otherwise until the sodium has melted (M. P., 97.5° C.). Then a suitable high speed agitator is started and, preferably, an emulsifier consisting, for example, of ½% (based on sodium) of the dimer of linoleic acid is added. After a short period of agitation, a test sample of the dispersion shows the particle size to be in the 5 to 15 micron range. The stirring is stopped and the dispersion is allowed to cool to room temperature. This dispersion is now ready to be used in the selective dimerization. Inert liquids such as dibutyl ether, normal octane and straight run kerosenes, may be employed as suspension media for the dispersion. Any such dispersion having sufficiently finely divided alkali metal such as sodium, potassium, or lithium will suffice. Other well-known emulsifiers or dispersing substances may be used instead of the dimeric linoleic acid as the dispersing agent.

The alkali metal dispersion is added to the ether diluent which is pre-cooled to and preferably maintained between —20° C. to —50° C. It is only necessary to employ an amount of dispersed alkali metal stoichiometrically equal to the reactant to be dimerized, although excesses of up to 10% may be desirable.

Following addition of the dispersion to the ether, the olefinic hydrocarbon is added, preferably slowly and at approximately the same ratio as that at which it reacts with the alkali metal. For maximum reaction rates of dimerization, it is desirable to maintain constant agitation of the reaction mixture.

Under the aforesaid reaction conditions, the dialkali metal derivatives are rapidly and selectively formed and, generally, are formed as slurries of the dialkali metal derivatives of the dimer of the elofin in the reaction medium. At the same time, during the course of the reaction, minor amounts of alkali metal-alkenes and -alkadienes are formed. These metallic derivatives can then be carbonated to mixtures containing the salts of dicarboxylic acids, having two more carbon atoms per molecule than a dimer of the diolefin, and minor amounts of salts of unsaturated monocarboxylic acids.

The carbonation may be carried out by subjecting the metallo derivatives to contact with gaseous carbon dioxide, by contact with solid carbon dioxide or by means of a solution of carbon dioxide in a suitable inert liquid. The temperature for carbonation should preferably be controlled below 0° C. to avoid the formation of unwanted by-products. This carbonation forms chiefly the dimetallic salts of unsaturated aliphatic dicarboxylic acids containing two more carbon atoms than the dimetallic dimers from which they are produced. Thus, in the use of butadiene, there results by this method the selective production of the salts of $C_{10}$ unsaturated aliphatic dicarboxylic acids, and in minor proportions, the salts of unsaturated monocarboxylic acids comprised chiefly of $C_5$, $C_9$, and $C_{13}$ unsaturated acids as well as a small amount of polycarboxylic aliphatic unsaturated acids.

The carbonated mixture comprising the salts of unsaturated aliphatic acids is then mixed with an excess of hot water to destroy unreacted alkali metal and to dissolve the salts of the organic acids and, when a water soluble attrition agent is used, to also dissolve the attrition agent. The resulting aqueous solution is then subjected to hydrogenation whereby the organic acid salts are converted to the corresponding saturated salts, and the free acids are then liberated by neutralization with a mineral acid. Alternatively, the salts may be subjected to neutralization to free the organic acids followed by hydrogenation of the free acids. In either case, there resuts from the neutralization an organic phase containing the bulk of the liberated organic acids and an aqueous phase containing, in solution, water-soluble organic acids, water soluble salts formed in the neutralization step, and, when used, the water soluble attrition agent. Under such conditions, and although the bulk of the carboxylic acids dissolve in the resulting organic phase, a small amount (e. g., up to about 10% by weight of the total organic acids) normally remains in the aqueous phase. As a result of the neutralization operation carried out in an aqueous medium, and preferably in presence of a suitable liquid hydrocarbon, inorganic salt formation occurs in the liberation by the mineral acid of the carboxylic acids from their salts. Such inorganic salts, being water soluble, are dissolved in the aqueous phase which, as aforesaid, also contains in solution a small amount of carboxylic acids. Additionally, when a water soluble attrition agent has been employed in the metalation reaction, the aforesaid aqueous phase also contains the attrition agent in solution.

In accordance with this invention, the aqueous composition, containing saturated organic acids and inorganic acid salts, obtained from a process as aforedescribed, and particularly from neutralization of the product of the hydrogenation step, is subjected to extraction with a solvent selective for the diacids that correspond to the saturated diacids having two more carbon atoms/molecule than the dimer of the olefin subjected to the described metalation reaction with the alkali metal. In such a reaction utilizing butadiene and sodium, the solvent is selective for $C_{10}$ saturated aliphatic diacids.

When the aqueous phase containing the organic acids and inorganic acid salts is solvent extracted, or when the neutralization step is carried out in presence of a suitable selective solvent, there is obtained a solvent phase containing the bulk (e. g., about 90%) of the organic acids and an aqueous phase containing water-soluble organic acids and dissolved inorganic salts. Thus, in the use of sulfuric acid for neutralization, the aqueous phase from the solvent extraction contains, in addition to the dissolved water-soluble organic acids, the alkali metal sulfate formed in the neutralization as well as, when used, a water-soluble attrition agent. Subjection of the latter aqueous phase to repeated extraction treatments with the selective solvent (e. g., toluene) fails to substantially, if at all, further extract any of the organic acids from the aqueous phase.

It has now been discovered that such an aqueous phase, comprising organic acids that were not extractable with the selective solvent (e. g., toluene), can be subjected to an elevated temperature for a period of time sufficient to convert a substantial amount of the toluene-insoluble organic acids to toluene-soluble organic acids whereby the resulting composition can be solvent extracted with toluene or a similarly effective selective solvent to recover an additional amount of organic acids. Solvents other than toluene include benzene, xylene, ethylbenzene, cumene, cymene, and the like. For example, in aqueous compositions obtained from a process as aforedescribed in which initial reaction is carried out between butadiene and sodium, followed by carbonation, hydrogenation and neutralization, there is obtained an aqueous composition containing $C_{10}$ aliphatic diacids including sebacic acid and isomers thereof as well as monocarboxylic aliphatic acids, polycarboxylic acids (i. e., more than two carboxyl groups per molecule) as well as inorganic salts. When the aqueous phase is extracted with toluene, or when the neutralization is carried out in presence of toluene, the bulk (e. g., about 90%) of the organic acids are extracted by the toluene, such extracted acids being comprised substantially of the desired $C_{10}$ diacids. Repeated treatment of the water phase with toluene fails to substantially, if at all, extract any additional organic acids. However, by subjecting such an aqueous phase to the treatment embodied herein, followed by solvent extraction of the resulting solution with toluene, a substantial amount of organic acids are obtained in the toluene phase and included therein is a substantial amount of $C_{10}$ saturated aliphatic diacids including sebacic acid and isomers thereof. Thus, by use of the treatment embodied herein, there results a substantial increase in the yield of desired diacids as illustrated, for example, by increased yield of $C_{10}$ saturated aliphatic diacids from a butadiene-sodium process as aforedescribed.

Although the aforedescribed aqueous phase per se containing the toluene-insoluble organic acids and dissolved inorganic salts (e. g., sodium sulfate) is preferably subjected to the elevated temperature treatment embodied herein to transform a substantial amount of such organic acids to toluene soluble acids, the transformation can be carried out by subjecting the organic acids to such a treatment in which case the aqueous phase is extracted with a suitable polar solvent (e. g., ether, sec. butanol, isophorone, etc.) and the resulting solvent phase containing the extracted organic acids is subjected to the elevated temperature treatment.

In accordance with this invention, the elevated temperature employed for conversion of the toluene-insoluble organic acids to toluene-solubles may be varied over a range of, for example, from about 100° C. to about 250° C., and preferably, sufficient to effect a substantial conversion of the toluene-insoluble acids to toluene soluble acids. Such a period of time may range from a few minutes (e. g., about 5) at the higher temperature to several hours (e. g., two hours) at the lower temperature. Particularly suitable embodiments include a temperature of from about 130 to 150° C. for a period of time of about one-half hour at the higher temperatures to about two hours at the lower temperatures and at about 150 to 155° C. for ½ to ¾ hour.

In order to further describe the invention, several embodiments by which it may suitably be carried out are described hereinafter. It should be understood, however, that use of such embodiments is for the purpose of illustrating and not for limiting the invention. Unless otherwise set forth, amounts of materials utilized in the process are expressed in parts by weight.

A mixture of 200 parts of sodium and 562 parts of a $C_{12}$ alkylate is heated until the sodium melts (M. P. 97.5° C.) and the resulting mixture is subjected to vigorous agitation. Four parts of aluminum stearate is then added whereby a sodium dispersion is produced in which the particle size of the sodium is in the range of 5 to 15 microns. The aforesaid dispersion is introduced into the metalator along with 2,000 parts of dimethyl ether (precooled to —30° C.), 473 parts of butadiene and 1 part of terphenyl. The metalation reaction occurs rapidly to produce a slurry comprising selectively formed disodio derivatives of octadienes and a small amount of intermediate products including sodiobutenes and other sodio alkenes. The reaction mixture from the metalator is then passed to a carbonator into which gaseous carbon dioxide is introduced in an amount substantially in excess of that theoretically required to carbonate the sodio derivatives in the metalation reaction product. The carbonator effluent, comprising disodium salts of $C_{10}$ unsaturated aliphatic diacids (3,7-decadienedioic acid, 7-vinyl-3-octenedioic acid and 2,5-divinyladipic acid), a small amount of monobasic unsaturated acids $C_5$, $C_9$, $C_{13}$, and higher, and a small amount of relatively high molecular weight organic acids of more than two carboxyl groups per molecule, dimethyl ether and minor amounts of by-product hydrocarbons is then subjected to an elevated temperature (120° C.) whereby substantially complete evaporation of the dimethyl ether and excess carbon dioxide is effected. The carbonator effluent, from which the ether and carbon dioxide is removed, is then admixed in the hydrolyzer with an excess of hot water whereby unreacted sodium present in the carbonator effluent is destroyed and water soluble sodium salts of the organic acids are dissolved. The aqueous solution from the hydrolyzer is filtered to insure removal of solid materials (e. g., water-insoluble polymers that may have formed) and the aqueous filtrate is then subjected to hydrogenation using 2% of nickel as a hydrogenation catalyst. There is thus produced an aqueous solution of the corresponding saturated salts of the unsaturated salts subjected to hydrogenation. The aqueous solution from the hydrogenator is then subjected to filtration to remove solid materials (e. g., hydrogenation catalyst). To the filtrate, toluene and sulfuric acid are added, the amount of toluene being in the ratio of two parts per part of organic acids in the filtrate and the sulfuric acid in an amount sufficient to neutralize the salts of the organic acids in the filtrate. There results from such treatment of the hydrogenated product (1) an organic phase containing about 90% by weight of the organic acids liberated by the neutralization treatment and (2) an aqueous phase (pH=2) comprising in solution the remainder of the organic acids and the sodium sulfate formed in the neutralization of the sodium salts by sulfuric acid, such an aqueous phase containing about 1.4 pounds/gal. of sodium sulfate and about 0.2 pounds/gal. of water-soluble organic acids, i. e., about a 14% solution of sodium sulfate and about a 2% solution of organic acids that were not extractable with toluene. The following examples illustrate the results obtained by treatment of such an aqueous phase in accordance with embodiments of this invention. In such examples, the yield shown for sebacic acid and isomers of sebacic acid (2-ethylsuberic acid and 2,5-diethyladipic acid) is the percent by weight based on the total amount of organic acids in the aqueous phase subjected to the described treatment.

*Example 1*

The aqueous phase per se was subjected to treatment at temperatures and periods of time set forth in the following tabulation followed by extractions with toluene in an amount of 2 parts of toluene per part of acids with obtainment of sebacic acid and its isomers in the yields shown.

| Temp., °C. | Time, Hrs. | Yield (Percent of Water Soluble Acids) | | |
|---|---|---|---|---|
| | | Sebacic Acid | Isomers of Sebacic Acid | Total Yield Percent |
| 150 | ½ | 22.0 | 20.5 | 42.5 |
| 150 | 4 | 22.6 | 21.8 | 44.4 |
| 175 | 2 | 21.8 | 18.7 | 40.5 |
| 130 | 2 | 24.6 | 15.7 | 40.3 |
| 175 | 5 | 25.0 | 11.5 | 36.5 |

*Example 2*

The aqueous phase was extracted with quinoline (2 parts per part of acid) providing a quinoline phase containing the extracted organic acids from the aqueous phase. The quinoline phase was then heated to 237° C. for 1½ hours whereby 18.8% of the total organic acids were converted to sebacic acid and 23.2% to isomers of sebacic acid.

*Example 3*

The aqueous phase was extracted with diethylether and the ether was then removed by evaporation thereby providing the organic acid content in anhydrous form. The anhydrous acids were then heated to 196° C. for 2 hours whereby 30% of the total acids were converted to sebacic acid and 42.5% to isomers of sebacic acid.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. In a process for production of toluene-soluble organic acids by selectively reacting an aliphatic conjugated diolefin with an alkali metal to form a mixture comprising dialkali metal derivatives of dimers of the diolefin, carbonating said mixture to form a mixture comprising dialkali metal salts of organic acids having two more carbon atoms/molecule than said diolefin dimer and conversion of said mixture of salts by hydrogenation and acidification to a mixture of toluene-soluble water-insoluble organic acids and toluene-insoluble water-soluble organic acids, the improvement providing for obtainment of increased yield of toluene-soluble organic acids which comprises subjecting the toluene-insoluble water-soluble organic acid components, separated from their mixture with toluene-soluble water-insoluble organic acids, to an elevated temperature up to about 250° C. for a period of time sufficient to convert a substantial portion of said toluene-insoluble organic acids to toluene-soluble organic acids.

2. A process, as defined in claim 1, wherein the toluene-insoluble water-soluble organic acids are subjected to said treatment at an elevated temperature in aqueous solution.

3. A process, as defined in claim 1, wherein the toluene-insoluble water-soluble organic acids are subjected to a temperature of from about 100 to about 250° C. for a period of time of from about one-half to about two hours.

4. A process, as defined in claim 1, wherein the toluene-insoluble water-soluble organic acids are subjected to a temperature of about 130 to about 150° C. for from about one-half to about two hours.

5. In a process for production of saturated $C_{10}$ aliphatic diacids by selectively reacting butadiene with finely divided sodium to form a mixture comprising isomeric disodiooctadienes, carbonating said mixture to form a carbonated mixture comprising isomeric disodio salts of $C_{10}$ unsaturated diacids, and conversion of said mixture of salts by hydrogenation and acidification to a mixture of free organic acids including toluene-soluble isomeric $C_{10}$ saturated aliphatic diacids and toluene-insoluble water-soluble organic acids, the improvement providing for obtainment of increased yields of $C_{10}$ saturated aliphatic diacids which comprises subjecting the water-soluble organic acids, separated from the mixture with the toluene-soluble acids, to an elevated temperature up to about 250° C. for a period of time sufficient to convert a substantial portion of said water-soluble organic acids to $C_{10}$ toluene-soluble aliphatic diacids.

6. In a process for production of saturated $C_{10}$ aliphatic diacids by selectively reacting butadiene with finely divided sodium to form a mixture of isomeric disodiooctadienes, carbonating said mixture to form a carbonated mixture comprising isomeric disodio salts of $C_{10}$ unsaturated aliphatic diacids, hydrogenating said carbonated mixture in an aqueous medium to saturate the sodio salts present therein, and acidifying the resulting hydrogenated aqueous mixture in presence of a selective solvent for toluene-soluble $C_{10}$ diacids liberated from their salts by the acidification thereby providing a solvent phase containing toluene-soluble $C_{10}$ saturated aliphatic diacids and an aqueous phase containing water-soluble toluene-insoluble organic acids, the improvement providing for obtainment of increased yields of toluene-soluble $C_{10}$ saturated aliphatic diacids which comprises subjecting the aqueous phase containing the water-soluble organic acids to an elevated temperature up to about 250° C. for a period of time sufficient to convert a substantial portion of said water-soluble organic acids to $C_{10}$ toluene-soluble diacids.

7. A process, as defined in claim 6, wherein the aqueous phase, following its treatment at the elevated temperature, is solvent extracted with a selective hydrocarbon solvent for the $C_{10}$ aliphatic saturated diacids.

8. A process, as defined in claim 6, wherein the toluene-insoluble water-soluble organic acids are subjected to a temperature of from about 100 to about 250° C. for a period of time of from one-half to about two hours.

9. A process, as defined in claim 6, wherein the toluene-insoluble water-soluble organic acids are subjected to a temperature of about 130 to about 150° C. for from about one-half to about two hours.

(References on following page)

References Cited in the file of this patent

UNITED STATES PATENTS

| | | |
|---|---|---|
| 2,352,461 | Walker | June 27, 1944 |
| 2,680,713 | Lindsey et al. | June 8, 1954 |
| 2,749,364 | Greenberg | June 5, 1956 |
| 2,773,092 | Carley et al. | Dec. 4, 1956 |

OTHER REFERENCES

Tipson, Tech. of Org. Chem., vol. III (edited by Weissberger) (1950), pages 481–2, 420–26.

Groggins, Unit Processes in Organic Synthesis (1952), pp. 488–92.